United States Patent Office 3,573,204
Patented Mar. 30, 1971

3,573,204
METHOD OF FABRICATING HIGH STRENGTH, SELF-LUBRICATING MATERIALS
Jan W. Van Wyk, Seattle, Wash., assignor to The Boeing Company, Seattle, Wash.
No Drawing. Continuation-in-part of application Ser. No. 675,328, Oct. 16, 1967, now Patent No. 3,479,289, dated Nov. 18, 1969, which is a continuation-in-part of application Ser. No. 499,367, Oct. 21, 1965. This application Nov. 14, 1969, Ser. No. 877,029
Int. Cl. C10m 5/02
U.S. Cl. 252—12  5 Claims

ABSTRACT OF THE DISCLOSURE

Compaction of a powdered mixture of Group V–B, VI–B or rare earth chalcogenides and a refractory metal under sufficient heat and pressure to sinter the powder mixture and to react at least some of the refractory metal with carbon to form a metal matrix solid lubricant composite containing a refractory metal carbide. Graphite dies may be used to provide carbon for carbide formation.

CROSS REFERENCES TO RELATED APPLICATIONS

This application is a continuation-in-part of application Ser. No. 675,328 filed Oct. 6, 1967, for "High Strength, Self-Lubricating Materials," now issued as U.S. Pat. No. 3,479,289; which last mentioned application was a continuation-in-part of application Ser. No. 499,367 filed Oct. 21, 1965, for "Solid Lubricant Materials," now abandoned.

BACKGROUND OF THE INVENTION

This invention relates to methods for fabricating solid lubricant composites that, in addition to having selective friction qualities and low wear characteristics, also possess high strength properties. The self-lubricating materials made possible by the fabrication method of this invention also exhibit various degrees of electrical conductivity and may be used at high stress levels in air, vacuum, or inert atmospheres over a temperature range of from minus 420° F. to 2400° F.

Several solid lubricant materials are known in the prior art that possess good lubricating properties and low shear strength. In addition to graphite, these materials include the chalcogenides such as the rare earth sulfides, selenides, tellurides, and, perhaps the most well known, molybdenum disulfide and tungsten disulfide. Generally, these materials have suitable application where low friction characteristics are desired under low stress conditions. However, where high loading is imposed upon the lubrication system, these prior art materials cannot withstand the high stress conditions and their use under such circumstances results in early failure. With the possible exception of graphite, these prior art solid lubricant materials have low tolerance to high temperatures and cannot be used in systems subject to more than a few hundred degrees Fahrenheit. Various attempts have been made to include graphite and the chalcogenides within a binder comprising such metals as iron, nickel, and lead in order to produce a solid lubricant composition retaining the self-lubricating properties of graphite or the chalcogenides and yet having the high strength and wear characteristics of the binder materials. While these materials have had some success, no process exists in the prior art for fabricating solid lubricant materials that will meet the extreme operating conditions mentioned above. While these operating conditions were previously little encountered, such conditions are now typical in space technology and the need to provide lubricating materials to meet these conditions has become pressing.

SUMMARY

In its simplest form, the method of fabricating solid lubricant composites of this invention comprises hot pressing, or compacting under heat and pressure, suitably sized powders of a chalcogenide and a carbide forming refractory metal in graphite dies with sufficient heat and pressure to not only sinter the powders into a solid mass but also to react some of the refractory metal with carbon from the graphite dies to form a refractory metal carbide within the composite. By applying sufficient compaction pressure, the disassociation of the chalcogenides which normally occurs at approximately 2000° F. to 2200° F. can be substantially inhibited up to temperatures sufficient to permit refractory metal carbide formation.

While it is expedient to have the carbon for carbide formation available by the use of graphite dies, carbon can also be provided for this purpose by the introduction of small quantities of a petroleum base oil into the powder mixture or by introducing a carbonaceous gas into the die cavity.

The chalcogenides that are useful for the practice of this invention are compounds such as sulfides, selenides, and tellurides, which possess layer lattice structure and are known to exhibit special lubricating ability. The chalcogenides may be compounded with the Group V–B and VI–B refractory metals of the Periodic Table, such as molybdenum, niobium, tantalum, and tungsten, or with the rare earth metals such as holmium, samarium, and yttrium. The Group V–B and VI–B chalcogenides have particularly wide application when used in the practice of this invention while the rare earth chalcogenides have a somewhat more limited application due to the relatively high cost of the rare earth metals.

The sintered refractory metal and the refractory metal carbides are distributed throughout the composite formed by the practice of this invention and contribute significantly to the strength and wear characteristics of the composite. In this sense, the composite is designated as being a metal matrix solid lubricant. Depending upon the compositional percentages of the ingredients used in the practice of this invention, the matrix structure of the sintered refractory metal and the refractory metal carbide may be continuous throughout the composite or may be discontinuous with relatively large volumes of chalcogenide. With large percentages of refractory metal used in the fabrication of the composite, a continuous matrix structure would be more likely; while large percentages of the chalcogenide would tend to yield a more discontinuous matrix structure in the composite. The term matrix as used herein is intended to designate this relatively wide range of structural configurations found in the composites fabricated according to the teaching of this invention.

It is therefore an object of this invention to provide a method of fabricating a metal matrix solid lubricant composite containing a self-lubricating chalcogenide component and a refractory metal carbide component.

It is another object of this invention to provide a method of compacting under heat and pressure a chalcogenide powder and a carbide forming refractory metal powder in the presence of carbon to form a solid lubricant composite retaining the self-lubricating properties of the chalcogenide component and the high strength and low wear properties of refractory metal carbides.

It is yet another object of this invention to provide a process for compacting under heat and pressure powdered chalcogenide materials, such as molybdenum disulfide and tungsten disulfide, and powdered refractory metal and to react some of the refractory metal with carbon to form refractory metal carbides to produce a solid lubricant composite having selective lubricating properties along with high strength and low wear characteristics.

DESCRIPTION OF THE PREFERRED EMBODIMENTS

I performed considerable research to explore the maximum temperature at which certain chalcogenides, particularly molybdenum disulfide, could be sintered with refractory metal binder materials without causing a disassociation of the molybdenum during the sintering operation. I discovered that if a compaction pressure of 5,000 p.s.i. was applied to the chalcogenide and the refractory metal binder during sintering, that disassociation of the chalcogenide could be significantly inhibited at temperatures up to 3300° F. This result was unexpected inasmuch as chalcogenides such as molybdenum disulfide normally disassociate at a temperature of between 2000° F. and 2200° F. at atmospheric pressure. After discovering this unexpected ability of chalcogenides to withstand high sintering temperatures, I realized that the full capabilities of these solid lubricant materials could be realized by reacting the refractory metal with carbon at the elevated temperatures to produce a refractory metal carbide in the resultant metal matrix solid lubricant composite and thus markedly increase the high strength and wear resistant characteristics of the composite.

The selected chalcogenide and refractory metal components should be prepared in a powder form, the individual particles of which may vary considerably in size. Generally, smaller particle sizes will yield a final sintered composite that has greater structural integrity than will large particle sizes. It has been found that refractory metal particles larger than about 100 mesh do not provide very satisfactory sintering; while particle sizes in the range of 1 to 5 microns or smaller, because of their increased surface area and thus greater susceptibility to oxidation, pose problems of contamination during handling of the raw materials. Satisfactory results have been obtained with the use of chalcogenide powders and refractory metal powders commercially available at 99.9 percent plus purity and in a particle size of 325 mesh.

After weighing appropriate amounts of the components to be used, the metallic refractory powders, if more than one refractory component is being used, are first blended together before being mixed with the chalcogenide powder. For mixing the metallic refractory powders with the chalcogenide powders, either standard screening techniques may be used or the mixing may be accomplished in an automatic mortar. In the latter case, the powder mixture is loaded into an alumina mortar and a quantity of acetone sufficient to provide a free flowing slurry is added to it. An alumina pestle is positioned in the mortar and the automatic mixing continued for 20 minutes with periodic additions of acetone to maintain the slurry During the final 5 minutes of automatic mixing, no acetone is added, permitting the mixture to be worked into a thick paste. The paste mixture is removed from the mortar with a spatula and dried in a vacuum oven at approximately 29 inches of mercury at 200° F. for one hour. The dried powder may then be passed through an 80 mesh screen and is then ready for placing into a die.

Another method of mixing the refractory and chalcogenide powders is the use of a commercially available V-shell blender in the manner well known in the art. Since the V-shell blender yields a powder mixture that is loose and fluffy, it is desirable to slug or pre-compact the mixture before it is placed in the hot pressing dies for sintering. Slugging of the fluffy powder mixture is accomplished by placing the mixture in a steel die and subjecting it to approximately 15,000 p.s.i. at room temperature to compact the mixture into a slug or disc having a volume reduction of about 7 or 8. The disc is then broken up with a mortar and pestle and passed through a 35–80 mesh screen; and the resultant powder is then ready for placing in the hot pressing die.

The die used for the subsequent compaction and sintering procedures may be configured either to yield a part in finished form, or to yield a blank which may later be machined to provide a solid lubricant item or a particular application. It has been found particularly advantageous to use a graphite die made of "ATJ" graphite produced by the National Carbon Corporation. Another graphite material that has been found useful is "Graph-I-Tite," Grade G, made by the Basic Carbon Corporation. By the use of a graphite die, it has been found that the carbon from the graphite is available for reaction with the refractory metal component during the compaction process to form refractory metal carbides in the final composite. However, carbon can be made available for this reaction from sources other than a graphite die. For example, it has been found that certain commercially available chalcogenides, such as molybdenum disulfide, contain small amounts of a petroleum base oil ranging from 0.02 to 0.05 percent by weight. While the quantity of carbon that may be available from this source to react with the refractory metals is quite small, additional amounts of petroleum base oil could be added for those cases where only a small amount of carbide formation is desired. Carbon may also be available from carbonaceous gases present in the die cavity. It is felt that the presence of carbon monoxide or methane in the die cavity provides a potential source of carbon to react with the refractory metal.

If the powder mixture is not completely dry when placed in the die, it is desirable to subject the mixture to a drying cycle before beginning the compaction or hot pressing process. This is readily accomplished by heating the graphite die containing the powder mixture to a temperature of about 300° F. and maintaining that temperature for a period sufficiently long to drive off any water vapor that may be contained within the powder. The duration of the drying cycle is not critical and normally lasts for about 5 minutes.

If the die is not being operated in a vacuum environment, it is desirable to densify the powder and expel any excess air or other gases in the die cavity before applying the full compaction heat and pressure. To densify the powder mixture, a compaction pressure of 1000 p.s.i. is applied to the die cavity which densifies the powder by a factor of about 5 to 10. Even if the V-shell blender and slugging procedure had been used to prepare the powder mixture as described above, it is still desirable to densify the powder at this point, in which case the densification factor would be about 2 to 3.

After the power mixture has been densified, the pressure is released and the compaction process or hot pressing is initiated by heating the die assembly to a temperature range of from 2400° F. to 3300° F. and applying a compaction pressure of between 2500 p.s.i. to 9000 p.s.i. or greater. The compaction pressure may be applied by means of a hydraulic cylinder or dead weight lever system and it has been found desirable to apply this pressure in a two-step manner as follows:

First, one-half to one-fifth of the final intended press load is applied and held until the temperature of the assembly has been increased to the sintering temperature. This usually requires about 20 minutes, the exact time being dependent upon the size of the dies and the power of the heating apparatus. When the sintering temperature has been reached, the partial press load is momentarily removed to allow the die parts to realign themselves, and then the full press load is applied and held for a period that may be as long as 30 to 60 minutes. It is during this period that the powder mixture in the die cavity sinters and that the carbon available from the dies themselves, or from the other sources mentioned above, react with at least some of the refractory metal to form refractory metal carbides. It has been found that increasing this duration will result in greater densification and more complete sintering of the composite as well as provide greater carbide formation. It appears that a duration of at least 2 minutes or so is required for satisfactory sintering and carbide formation and that durations greater than about 60 minutes do not appear to give noticeably increased results. Particularly satisfactory results have been obtained with durations of from 10 to 20 minutes.

As an alternative hot pressing method, approximately one-half of the final intended press load may be applied to the die assembly at room temperature and then released. The die assembly is thereafter heated to sintering temperature at which time the full press load applied and held for the duration indicated above.

During the compaction process the temperature of the powder mixture in the die assembly should be raised to at least 2400° F. in order to obtain satisfactory carbide formation. It has been found that at temperatures below 2400° F. the reaction between carbon and the refractory metal producing a refractory metal carbide did not proceed to any significant extent. The maximum temperature to which the powder mixture is subjected should be limited so as not to cause catastrophic disassociation of the chalcogenide material. It has been found that the maximum practical temperature is approximately 3300° F. under a pressure of at least 5000 p.s.i. Compaction pressures as low as 2500 p.s.i. may be suitable where the temperature of the powder mixture is not raised much beyond 2500° F.; but where higher temperatures up to 3300° F. are used to promote carbide formation, pressures as high as 10,000 p.s.i. may be desirable. Compaction pressures as high as 22,500 p.s.i. have been used, but little improvement was seen over those cases in which the pressures were limited to 7,000 to 10,000 p.s.i.

Even when using compaction pressures from 5,000 to 10,000 p.s.i. some disassociation of the chalcogenide component is evident. In the case of the use of molybdenum disulfide, the chemical reactions which occur during the compaction process can be illustrated as follows:

$$MoS_2 + R + C \rightarrow MoS_2 + RS_2 + MoRS_2 + R + RC$$

Where R refers to the refractory metal component such as molybdenum, niobium, tantalum, or tungsten. In the case where graphite dies are used as the principal supply of carbon, the diffusion of the carbon from the dies into the powder mixture results in a formation of refractory metal carbides. A limited amount of breakdown or disassociation of the chalcogenide, in this case molybdenum disulfide, provides additional molybdenum for carbide formation and permits the formation of complex refractory metal sulfides. The formation of these compounds results in a solid lubricant material which has excellent wear resistance and high strength, characteristic of the carbides, and yet also possesses many of the low friction qualities inherent in the chalcogenides.

After the compacting pressure and temperature have been maintained on the die assembly for a sufficient duration to allow sintering of the powdered components and carbide formation, the material may be cooled simply by removing the power from the heating apparatus and permitting the die assembly to cool to room temperature. The compacting pressure may be removed from the die assembly immediately after power cutoff. Rapid cooling or quenching may be employed for controlling grain growth of certain composites that are able to withstand the thermal shock so induced.

It is normally desirable to purge the heating apparatus containing the die assembly with argon, nitrogen, or other inert gas before and during the compaction, or hot pressing, to ensure an inert atmosphere around the die and thus inhibit oxidation of the powder mixture and of the die itself. Such oxidation can also be inhibited by carrying out the hot pressing operation in vacuum.

The fabrication method of this invention may be successfully employed with a wide range of chalcogenides and refractory metals to produce a solid lubricant composite retaining the self-lubricating properties characteristic of the chalcogenides and imparting to the composite the high strength and low wear characteristics of the refractory metal carbides. Examples of particular chalcogenides that may be successfully employed include the Group V–B and VI–B chalcogenides comprising the disulfides, diselenides, and ditellurides, each of molybdenum, niobium, tantalum, and tungsten. Additional chalcogenides of the rare earth metals such as holmium, sumarium, and yttrium may also be used. Examples of refractory metals that may be employed in the processes of this invention include molybdenum, niobium, tantalum, and tungsten. An example of specific formulations would be from 20.0 to 97.0 percent by weight of a dichalcogenide selected from the group consisting of molybdenum disulfide, tungsten disulfide, and combinations thereof; and from 0.01 to 80.0 percent by weight of a carbide forming refractory metal selected from the group consisting of molybdenum, niobium, tantalum, tungsten, and combinations thereof. Additional ingredients may be added to these mixtures in the practice of this invention to achieve specific results. For example, a powdered boron metal component of up to 5 percent by weight may be added to the mixture in order to further enhance the structural properties of the solid lubricant. The boron constituent is felt to enter the final composition as a solid solution with the possibility of some metallic boride being formed. Relatively small additions of approximately 1 percent by weight are seen to significantly increase the ultimate compressive strength of many of these compositions while additions of boron in excess of 5 percent by weight have resulted in decreased compressive strength. In addition, there is some evidence that the boron component acts as a lubricant during the fabrication process, thus yielding a composite with a greater degree of compaction than would otherwise be obtained. Other ingredients may be added to the above described mixtures to provide further lubrication during the fabrication process. In particular it has been found that the addition of up to 53 percent by weight of a metal powder component selected from the group consisting of iron, nickel, chromium, and cobalt provides significant lubrication during the compaction of the powder mixture. These metals possess melting points considerably below that of the carbide forming refractory metals and their presence provides additional lubrication during the fabrication process thus yielding greater compaction of the resulting composite. However, the addition of these fabrication lubricants does not add significantly to the structural properties of the resulting composition and their presence imposes certain temperature limitations upon the application of the resulting solid lubricant materials.

Specific example formulations of the compositions that may be fabricated according to the processes of this invention, as well as the resultant properties of these compositions, can be found in U.S. Pat. No. 3,479,289 "High Strength, Self-Lubricating Materials."

I claim:
1. A method of fabricating a metal matrix solid lubricant composite containing a solid lubricant chalcogenide component and a refractory metal carbide component comprising the steps of:
 (a) heating to a temperature of at least 2400° F. a mixture of chalcogenide powder selected from the group consisting of the Group V–B, Group VI–B, and the rare earth chalcogenides, and combinations thereof, carbon, and a carbide forming refractory metal powder;
 (b) compacting the heated mixture at a pressure of at least 2500 p.s.i.; and
 (c) while maintaining said temperature and compacting pressure, reacting refractory metal of the mixture with carbon to form a refractory metal carbide within the composite.

2. A method of fabricating a metal matrix solid lubricant composite having a solid lubricant chalcogenide component and a refractory metal carbide component comprising the steps of:
  (a) heating to a temperature of approximately 2400° F. to 3300° F. a mixture of a chalcogenide powder selected from the group consisting of the dichalcogenides of molybdenum, niobium, tantalum, tungsten, and combinations thereof, carbon, and a refractory metal powder selected from the group consisting of molybdenum, niobium, tantalum, tungsten, and combinations thereof;
  (b) compacting the heated mixture at a pressure of approximately 2500 p.s.i. to 9000 p.s.i.; and
  (c) while maintaining said temperature and said compacting pressure, reacting at least some of the refractory metal with carbon to form a refractory metal carbide within the composite.

3. A method of fabricating a metal matrix solid lubricant composite having a solid lubricant chalcogenide component and a refractory metal carbide component comprising the steps of:
  (a) introducing into a graphite die a mixture of from 20.0 to 97.0 percent by weight of a chalcogenide selected from the group consisting of molybdenum disulfide, tungsten disulfide, and combinations thereof; and from 0.01 to 80.0 percent by weight of a carbide forming refractory metal selected from the group consisting of molybdenum, niobium, tantalum, tungsten, and combinations thereof;
  (b) heating the mixture in the graphite die to a temperature of approximately 2400° F. to 3300° F.;
  (c) compacting the heated mixture at a pressure of approximately 2500 p.s.i. to 9000 p.s.i.; and
  (d) maintaining said temperature and said compacting pressure for at least approximately 2 minutes to permit the sintering of the mixture and to react at least some of the refractory metal with carbon from the graphite die to form a refractory metal carbide within the composite.

4. The method as claimed in claim 3 further including between steps (a) and (b) the additional step comprising: compacting the powder mixture to a pressure of approximately 1000 p.s.i. to densify the mixture and expel included gases.

5. A method of fabricating a metal matrix solid lubricant composite having a solid lubricant chalcogenide component and a refractory metal carbide component comprising the steps of:
  (a) preparing a dry mixture of from 20.0 to 97.0 percent by weight of a chalcogenide powder having a particle size of less than 100 mesh and from 0.01 to 80.0 percent by weight of a carbide forming refractory metal powder having a particle size of less than 100 mesh; said chalcogenide powder being selected from the group consisting of molybdenum disulfide, tungsten disulfide, and combinations thereof; and said carbide forming refractory metal being selected from the group consisting of molybdenum, niobium, tantalum, tungsten, and combinations thereof;
  (b) in a graphite die, initially compacting said powder mixture under a press load of from 1250 p.s.i. to 4500 p.s.i.;
  (c) after releasing the press load of step (b), heating the powder mixture in the graphite die to a temperature of approximately 2400° F. to 3300° F.;
  (d) upon obtaining the temperature of step (c), finally compacting the powder mixture in the graphite die under a press load of approximately twice that applied in step (b); and
  (e) maintaining said temperature and said final press load for a duration of approximately 10–20 minutes to sinter the powder mixture and to react at least some of the refractory metal with carbon from the graphite die to form a refractory metal carbide within the composite.

References Cited
UNITED STATES PATENTS
3,479,289  11/1969  Van Wyk _____ 252—12

DANIEL E. WYMAN, Primary Examiner

I. VAUGHN, Assistant Examiner